March 13, 1956 A. I. MIHALAKIS 2,738,490
PROJECTED WARNING SIGNALS FOR VEHICLES
Filed Feb. 13, 1951
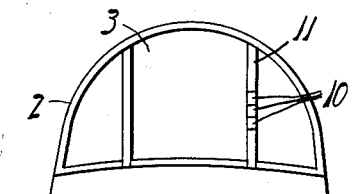
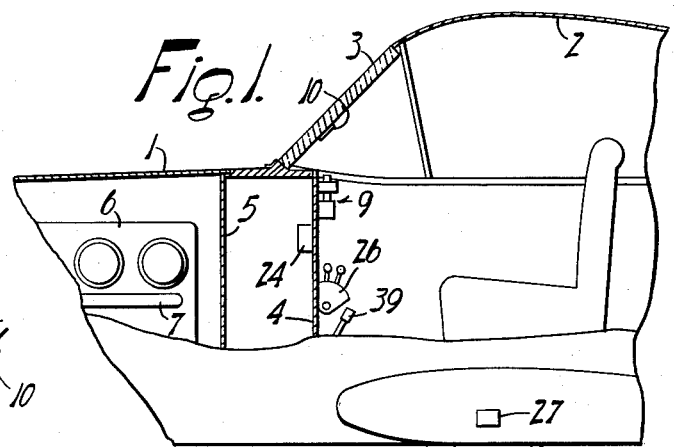
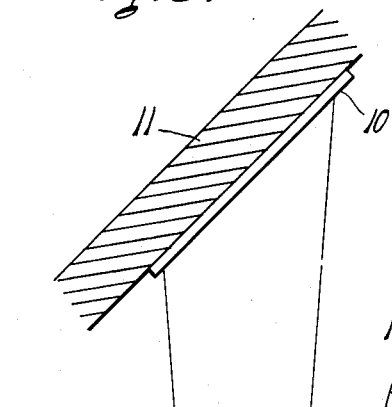
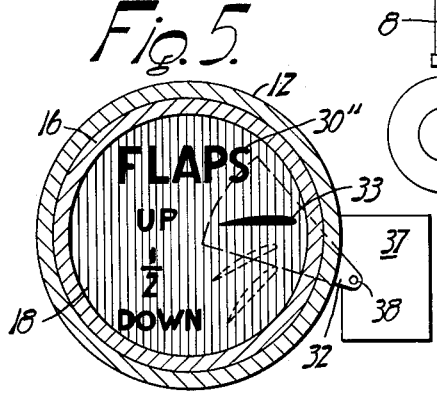
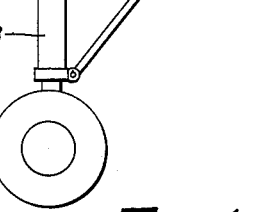
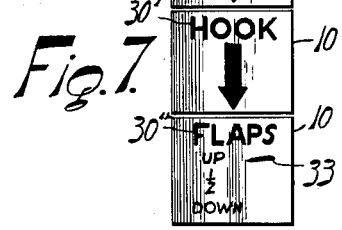
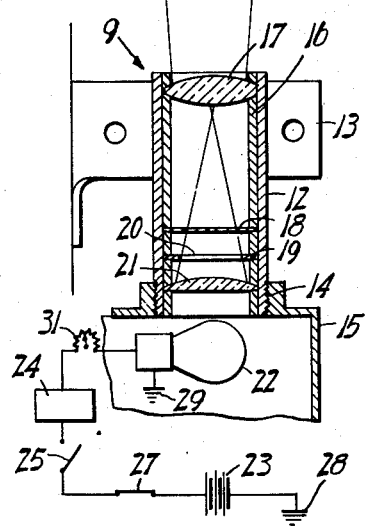
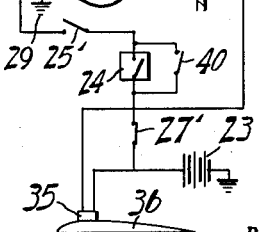
INVENTOR.
Agis I. Mihalakis
BY
Bean, Brooks, Buckley & Bean.
ATTORNEYS

United States Patent Office 2,738,490
Patented Mar. 13, 1956

2,738,490
PROJECTED WARNING SIGNALS FOR VEHICLES

Agis I. Mihalakis, Buffalo, N. Y., assignor to Glowmeter Corporation, Buffalo, N. Y.

Application February 13, 1951, Serial No. 210,731

11 Claims. (Cl. 340—27)

This invention relates generally to the field of instrumentation, and, more particularly, to a new and useful warning instrument adapted for use on aircraft as well as other vehicles.

The advent and development of the airplane has created many new problems in the field of instrumentation, as well as accentuated many old ones. One source of difficulty lies in the fact that, in an airplane, safe operation during a particular maneuver requires not only that the engine be functioning properly, but also that certain component parts of the airplane assume a predetermined position. For example, in an aircraft utilizing a retractable landing gear, a safe landing operation requires that the landing gear be lowered and locked in down position. However, pilots periodically forget to lower their landing gear, and thus there arises the problem of warning the pilot of the existence of this dangerous situation. Also, in the case of carrier-based aircraft, wherein a retractable hook extending beneath the airplane is caught by a guy-line on the flight deck, the pilot is at times so occupied with other considerations that he forgets to lower the said hook, and some means must be found to warn him when such is the case. In addition, it is important that wing flaps be properly adjusted for landing and take-off operations. Here again, it is not uncommon for a pilot to momentarily overlook this detail, and it is highly desirable to provide some means for warning the pilot to check his flaps and adjust them when necessary.

These examples could be extended to cover virtually every essential movable component of an airplane, but the basic problem remains the same; a means must be provided to give clear and unmistakable warning whenever an essential movable part of the airplane is not in the predetermined correct position for a particular maneuver. This problem is rendered even more difficult by the fact that a pilot must continually survey and digest the intelligence being conveyed to him by a myriad of instruments, and is thus unable to study and reflect upon any one particular instrument or indicator.

Prior art warning instruments and indicators have in general proven to be very unsatisfactory. Quite often they have been placed on the instrument panel itself where they are surrounded by other instruments and fail to attract attention unless actually studied. Sometimes they have taken the form of mechanical devices with a movable member adapted to change position, which devices are not of a nature to unfailingly attract attention. The use of sound generating devices has also been proposed, but they are unnecessarily distracting and irritating, and obviously must be severely limited in number. Other prior art warning devices possess the disadvantage of being too bulky, or too expensive, and some, relying upon an illuminated signal, are visible practically only in darkness.

Accordingly, it is an object of this invention to provide a warning indicator which will invariably and immediately attract attention to the existence of an unsafe condition.

It is another object of this invention to provide a warning system which can be used to indicate the existence of almost any unsafe condition, and is thus of substantially universal adaptability.

An additional object of this invention is to provide a warning indicator which does not require scrutiny thereof to realize the existence and nature of the unsafe condition.

A further object of this invention is to provide a warning instrument which will begin operating immediately upon the creation of a predetermined unsafe condition, and will continue in operation until said unsafe condition has been corrected.

It is also an object of this invention to provide a warning instrument which will project a flashing color signal within the normal range of vision of the operator of the vehicle, which signal can be regulated in intensity and is clearly visible in daylight as well as in darkness.

Another object of this invention is to provide a warning instrument which can easily be combined with means indicating the position of a particular member.

In addition, an object of this invention is to provide a warning instrument of the aforementioned type which is relatively inexpensive to manufacture, simple in construction, compact, and entirely reliable in operation.

The foregoing and other objects will become apparent upon a perusal of the ensuing detailed description, taken together with the accompanying drawing, wherein:

Fig. 1 is a view of the cockpit of an airplane showing the warning instrument of the present invention installed therein, with certain parts in section and certain parts broken away for convenience of illustration;

Fig. 2 is a detail view of the warning instrument of the present invention, with parts in section for greater clarity;

Fig. 3 is a plan view of the windshield showing the location of the viewing means;

Fig. 4 is a detail sectional view of a modified warning instrument incorporating indicating means therein;

Fig. 5 is a view taken along the line V—V of Fig. 4;

Fig. 6 is a view of the image or warning signal which is intermittently projected into the range of vision of the pilot by the warning instrument of Fig. 2;

Fig. 7 is a view of a different image or signal which can be similarly projected by the warning instrument of the present invention; and Fig. 8 is a view of the image projected by the warning indicator of Fig. 4.

It is to be understood at the outset that while the present invention is disclosed as applied to an airplane, it is equally well adapted for use on other types of vehicles as well as in stationary installations.

There is shown in Fig. 1 of the drawing the cockpit of an airplane 1, which cockpit is enclosed by a canopy 2 and a windshield 3. An instrument panel 4 is located in the forward part of the cockpit, and in front of said panel is a firewall 5, forward of which is the motor compartment containing an engine block 6 with its accompanying intake manifold 7. A retractable landing gear 8 extends beneath aircraft 1.

The warning instrument of the present invention is shown generally at 9 as being located on panel 4, and projects a flashing image or warning signal onto a screen 10 which is located on part of the molding 11 around windshield 3, as shown more clearly in Fig. 3.

The warning instrument itself, as shown in Fig. 2, comprises a tubular casing 12 which is secured by means of a bracket 13 to panel 4. The lower end of tubular casing 12 is threaded, as at 14, and an enlarged housing 15 is threadedly engaged thereon. A tubular member 16 fits within tubular casing 12, and is appropriately notched or grooved to receive and hold in place an objective lens 17, a transparency 18, a masking member 19 containing an aperture 20, and a condenser lens 21. A source of illumination 22 is contained within housing 15, and this source of illumination is energized from a power source 23 to which it is connected through a blinker relay 24 and a switch 25 which is closed by retarding the throttle 26 of airplane 1. Also included within this energizing circuit is a down-lock switch 27 which is arranged to be closed whenever landing gear 8 is retracted, and opened when landing gear 8 is locked in down position. Power source 23 is appropriately grounded as at 28, and the source of illumination 22 is grounded at 29.

Transparency 18 has appropriate indicia 30 thereon, such as the word "wheels" and an arrow pointing downwardly, as shown in Fig. 6, whereby to indicate not only the existence of the unsafe condition, but also its nature and the necesesary correction. Of course, any other indicia appropriate to the intelligence which it is desired to convey could equally well be uesd. Preferably, transparency 18 is colored, whereby the projected image will be colored to more readily attract attention, and it has been found that certain shades of red are particularly adapted to this purpose. Of course, if desired, the transparency can be made with opaque indicia on a clear background or clear indicia on an opaque background and a separate color filter could be used.

Mask 19 is used to create a sharply defined border around the image, whereby a clear line of demarcation between the image and surrounding matter will be maintained. Condenser lens 21 collects the light rays from the source of illumination 22, and focuses them into a beam passing through aperture 20 and transparency 18, thereby intensely illuminating the indicia on said transparency. An image of the illuminated transparency is projected by objective lens 17 onto screen 10, said objective lens serving to focus the image on said screen. Obviously, tubular member 16 can be adjusted with tubular casing 12 to provide a clear image on screen 10.

Screen 10 is peculiarly adapted to the instant purpose, in that it is of the type disclosed in copending application Serial No. 162,851 for a Reflecting Screen, filed May 19, 1950, by Agis I. Mihalakis. This screen comprises a furrowed surface which has been subjected to a plating process, and is adapted to present a brilliant image even in broad daylight. Since screen 10 is located on molding 11 and is thus adjacent windshield 3, it is well within the pilot's normal range of vision whereby the reflected image will attract his attention even though he is not consciously watching the screen.

The operation of this warning indicator is as follows. Whenever landing gear 8 is in any position but locked down position, switch 27 will be closed. Then, if the pilot should retard throttle 26 to reduce the speed of airplane 1 below a predetermined minimum for any reason, as when preparing to land, switch 25 will close, thus completing the energizing circuit between power source 23 and light source 22 and illuminating light source 22. Blinker relay 24 serves to periodically interrupt this circuit, thus causing intermittent flashing of light source 22. Light source 22 will cooperate with transparency 18, in the manner previously described, to create the image shown in Fig. 6, and this image will be projected onto screen 10. By reason of the location of the screen, the intermittent flashing of the signal, and the color of the signal, the pilot's attention will immediately be attracted thereto, and he will be warned that he has retarded his throttle and that the landing gear is not in down-lock position. If he intends to land, he will thereupon be reminded to lower his landing gear, and the flashing warning will continue until landing gear 8 has become locked in down position, at which time switch 27 will open, or until throttle 26 has been accelerated to open switch 25, thus opening the power circuit to light source 22. This intelligence will be conveyed to the pilot immediately and unfailingly, and without requiring his scrutiny of the indicator. A manually operable rheostat 31 is included within the energizing circuit to light source 22, whereby the intensity of the projected image can be regulated.

Of course, this indicator can be used to give warning of virtually any other dangerous condition. Thus, in aircraft having a retractable hook designed to be caught by a guy rope, by merely changing the indicia on transparency 18 to that shown in Fig. 7 at 30', and by arranging switch 27 to be operated by the hook mechanism, not illustrated, the instrument will operate in the manner previously described to warm the pilot, upon retarding the throttle and accordingly reducing the speed of the aircraft below a predetermined minimum, when his landing hook is not in down-lock position. When the hook is properly lowered and locked in down position, the energizing circuit to light source 22 will open and the warning will cease flashing.

A further example of the adaptability of the warning indicator of the present invention is illustrated in Figs. 4, 5 and 8. In this modification, the warning indicator is adapted to warn a pilot to check, and if necessary adjust, his flaps whenever the speed of the aircraft is below a predetermined minimum. The problem overcome by this modification differs from those previously considered, because the wing flaps do not necessarily assume the same, identical position during landing and take-off operations, and a variable factor is thus introduced. Sometimes the flaps should be only partly lowered, while at other times they should be completely lowered, the particular position being dependent on wind velocity and direction, the load being carried, the length of the runway, and other factors. To provide for this variable factor, the warning indicator is adapted to project an appropriate warning signal whenever the speed of the aircraft is below a predetermined minimum and to continue projecting a warning signal either until the speed rises above said predetermined minimum, or until the aircraft engine is at idling speed. Whenever the speed of the plane is above idling speed but below said predetermined minimum, the pilot will be warned to check, and if necessary adjust, the flaps.

This modified warning indicator comprises a tubular casing 12, a housing 15 threadedly engaging with said casing at 14, a tubular member 16 contained within said casing, a colored transparency 18 having appropriate indicia 30" thereon, a mask 19 having an aperture 20 therein, and a light source 22 connected to be energized from a power source 23 through a blinker 24, all as previously described in connection with Fig. 2. A switch 25' is adapted to close the energizing circuit of light source 22 under the influence of the pressure in intake manifold 7, which manifold pressure varies with the speed of aircraft 1. The arrangement is such that whenever the speed of aircraft 1 is below a predetermined minimum, switch 25' will be closed to intermittently energize light source 22, whereupon a flashing colored image of the word "flaps" will be projected onto screen 10. A second switch 27', normally closed, is adapted to open the energizing circuit of light source 22 whenever engine 6 is at idling speed. Thus, switch 27' could be operated either by the pressure in manifold 7, or by throttle 26. However, if desired this last-named switch may be dispensed with, energizing and deenergizing of light source 22 being accomplished solely through switch 25'.

In addition to projecting a warning image, the warning instrument of the instant modification is adapted to project an indication of the position of the flaps. This is deemed particularly desirable since the position of the flaps varies under the influence of numerous external factors, and because quite frequently it is impossible for the pilot to see the flaps, as when flying blind, or when split-type flaps are used, and is accomplished in the following manner.

A transparent, segment-shaped member 32, bearing indicia 33 in the outline of a flap thereon, is pivotally mounted to extend through an aperture 34 in casing 12 and member 16. A transmitter 35 is located at a flap 36 of aircraft 1 so as to be controlled thereby, and is electrically connected to energize a receiver 37, which receiver is operatively connected to and pivotally supports segment-shaped member 32 by means of a shaft 38. Transmitter 35 can be any conventional means for transmitting the movement of a member on a reduced scale, such as a selsyn motor or a magnesyn type transmitter or the like, and is adapted to transmit a signal which varies with the position of a flap 36. Receiver 37 is adapted to move shaft 38 and consequently member 32 in accordance with the signal received from transmitter 35.

Indicia 30" includes appropriate markings such as "up," "½," and "down," and the arrangement is such that member 32 will cause flap silhouette 33 to move therebetween whereby the projected image will indicate the position of flap 36 as well as warn the pilot to check the flaps. In operation, whenever the speed of the aircraft is below a predetermined minimum but above idling speed, a flashing, colored image will be projected onto screen 10 as shown in Fig. 8, which image will instantly warn the pilot to check his flaps and make any necessary adjustments. In addition, the position of flap 36 will be clearly indicated by the imaged position of indicia 33. This warning will persist either until the speed of the aircraft rises above said predetermined minimum, or until engine 6 is at idling speed.

As will be seen from the drawing, transmitter 35 and receiver 37 are energized from power source 23, and this circuit can remain closed continuously, or switch 25' can be connected therein. Also, if desired, the energizing circuit to light source 22 can be arranged so that blinker 24 will be by-passed or remain closed whenever the flap control handle 39 is moved from "up" position. For this purpose, a short-circuit including a switch 40 can be arranged across blinker 24, with switch 40 adapted to be closed whenever flap control handle 39 is moved from "up" position. With such an arrangement, a flashing image will be projected first when the speed of the aircraft 1 is below a predetermined minimum and above idling speed; the flashing will cease and the image will be steadily projected while the flap control handle is being actuated; and all image projection will cease when engine 6 is operating at idling speed or above said predetermined minimum speed. In addition, rheostat 31 may be included in this energizing circuit to regulate the intensity of the projected image, if such is desired. Also, switch 27' can be arranged to open at any desired speed.

Switches 25 and 25' can be actuated by any means which vary with speed. Thus, they can be connected to the manifold pressure control solenoid which actuates the conventional retarded throttle warning horn, or to the throttle itself. In installations wherein the dangerous condition is not dependent upon speed, they can be connected in any appropriate circuit. Also, it will be appreciated that switches 27' and 40 can be connected in any desired manner. Thus, switch 27' can be actuated by flap 36 assuming a particular position, and switch 40 can be actuated either by flap 36 or by flap control handle 39, or by other means. In addition, it should be noted that switches 25, 25', 27, 27' and 40 are conventional switches, the details of which form no part of the present invention.

When all of the disclosed warning instruments are used, the screens 10 are mounted in vertical relation on molding 11, where they occupy but little room, and where images projected thereon will immediately attract the attention of the pilot. These warning instruments project a colored, flashing image which not only immediately attracts attention, but also gives warning of the nature of the unsafe condition without requiring close scrutiny. The projected images are clearly visible in daylight as well as in darkness, and the instruments are compact and relatively inexpensive to manufacture. Thus, it is apparent that the present invention fully accomplishes its aforesaid purposes, and is far superior to the warning indicators of the prior art. It is also apparent that this invention is not limited to the particular installations specifically disclosed, but is susceptible of many modifications and a wide range of uses and adaptations, and is to be limited only by the scope of the appended claims.

Having fully disclosed the instant invention, and having completely described its mode of operation, what is claimed as new is as follows:

1. A warning instrument system adapted for use on a vehicle comprising, a source of illumination, a source of electric energy, means responsive to a predetermined undesirable condition for energizing said source of illumination from said source of electric energy, means responsive to correction of said predetermined undesirable condition for deenergizing said source of illumination, viewing means comprising a light impervious screen located adjacent the windshield of said vehicle, a light-transmitting indicia-bearing member operatively alined with said source of illumination, and objective lens means in operative alinement with said indicia-bearing member and said screen and focusing the indicia on said screen, whereby a warning indicia image will appear on said screen whenever said predetermined undesirable condition exists.

2. An aircraft warning system comprising a source of illumination, a source of electric potential, electric circuit means adapted to interconnect said source of illumination and said source of electric potential and including means for closing said circuit means to energize said source of illumination upon the aircraft assuming an undesirable first predetermined flight attitude and means for opening said circuit means upon the aircraft assuming a corrective second predetermined flight attitude, viewing means comprising a light impervious reflecting screen located adjacent the windshield of the aircraft so as to be easily viewed by the aircraft operator, a light-transmitting indicia-bearing member operatively alined with said source of illumination, and the objective lens means in operative alinement with said indicia-bearing member and said screen and focusing the indicia on said screen, whereby a warning indicia image will be projected onto said viewing screen to immediately warn the operator upon the aircraft assuming said undesirable first predetermined flight attitude.

3. A warning instrument for aircraft comprising a stationary colored light-transmitting indicia-bearing member, a source of illumination operatively alined with said indicia-bearing member, a viewing screen positioned to be readily viewed by an observer within the aircraft, objective lens means operatively alined with said indicia-bearing member and said viewing screen and focusing the indicia on said screen, and predetermined undesirable condition-responsive electric circuit means including means for intermittently energizing said source of illumination, whereby a colored indicia image will be intermittently projected on said viewing screen to warn the aircraft operator of the existence of said predetermined undesirable condition.

4. A warning instrument system responsive to the existence of a predetermined undesirable condition comprising, a colored light-transmitting member having indicia thereon, a source of illumination in operative alinement with said member to illuminate the indicia thereon, viewing scree means, objective lens means in operative alinement with said light-transmitting member and said viewing screen means and focused on the latter for projecting an image of the indicia thus illuminated onto said viewing screen means, and electric circuit means for intermittently energizing said source of illumination upon the occurrence of said predetermined undesirable condition, whereby a colored indicia image will be intermittently projected onto said viewing screen means to give warning of the existence of said predetermined undesirable condition.

5. A vehicle warning instrument adapted to provide a visual warning of the existence of a predetermined undesirable condition and to simultaneously indicate the position and movement of a corrective component part of the vehicle comprising, in combination with said vehicle and said component part thereof, viewing screen means positioned to be readily viewed by the vehicle operator, a stationary colored indicia-bearing member, a movable indicia-bearing member, a source of illumination operatively alined with said indicia-bearing members, objective lens means operatively alined with said indicia-bearing members and said viewing screen means and focusing the indicia of said members on said screen means, electric circuit means for intermittently energizing said source of illumination upon the existence of a predetermined undesirable condition, and means connecting said movable indicia-bearing member to said component part for movement responsive thereto.

6. A warning instrument system adapted to give a visual warning of the existence of a predetermined undesirable condition comprising a path-defining member, a light-transmitting member bearing indicia thereon and fixed within said path-defining member, a source of illumination arranged in operative alinement with said path-defining member to illuminate said indicia member, viewing screen means remote from said path-defining member, means including an objective lens in operative alinement with said light-transmitting member and said viewing screen means and focused on the latter for projecting an image of the illuminated indicia onto said viewing screen means, and electric circuit means for intermittently energizing said source of illumination only upon the occurrence of a predetermined undesirable condition, whereby a flashing indicia image will be projected onto said viewing screen means to warn of the existence of said predetermined undesirable condition.

7. A warning system for use on a vehicle comprising a source of illumination, a source of electric potential, electric circuit means interconnecting said source of illumination and said source of electric potential and including first means adapted to close said circuit means when the vehicle is in an undesirable first predetermined condition of operation and second means adapted to open said circuit means when said vehicle is in a second predetermined condition of operation, viewing screen means positioned to be readily viewed by the vehicle operator, a light-transmitting indicia-bearing member operatively alined with said source of illumination, objective lens means in operative alinement with said indicia-bearing member and said screen and focusing the indicia on said screen, whereby a warning image will appear on said viewing screen means upon the occurrence of said undesirable first predetermined condition of operation and will persist until the occurrence of said second predetermined condition of operation, and means coloring the warning image.

8. In an aircraft having a retractable hook mechanism adapted to extend therefrom, a warning instrument system comprising a viewing screen positioned to be readily observed by the operator of the aircraft, a light-transmitting member having indicia appropriate only to said hook mechanism, a source of illumination operatively alined with said member to illuminate the indicia thereon, objective lens means in operative alinement with said member and said viewing screen and focusing the indicia on said viewing screen, and electric circuit means including means for energizing said source of illumination whenever the speed of the aircraft is below a predetermined minimum and means for deenergizing said source of illumination whenever said hook mechanism is in proper extended position, whereby whenever the speed of the aircraft is below said predetermined minimum an indicia image will be projected onto said viewing screen to warn the aircraft operator if the hook mechanism is not in proper extended position.

9. In an aircraft having a movable wing flap, a warning instrument system comprising a stationary colored light-transmitting indicia-bearing member, a movable indicia-bearing member, a source of illumination operatively alined with said indicia-bearing members, viewing screen means positioned to be readily viewed by the aircraft operator, objective lens means operatively alined with said indicia-bearing members and said viewing screen means and focusing the indicia on the latter, electric circuit means including means adapted to intermittently energize said source of illumination when the speed of said aircraft is below a first predetermined minimum and means adapted to deenergize said source of illumination when the speed of said aircraft is below a second predetermined minimum, and means adapted to move said movable indicia-bearing member in response to movement of said wing flap, said stationary member and said movable member cooperating to provide an image indicating the position of said wing flap.

10. An aircraft warning instrument as set forth in claim 9, including means for steadily energizing said source of illumination upon downward movement of said wing flap.

11. In an aircraft having a movable wing flap, a warning instrument system comprising a colored light-transmitting indicia-bearing member, a movable light-transmitting indicia-bearing member, a source of illumination operatively alined with said members, electric circuit means adapted to intermittently energize said source of illumination when the speed of said aircraft is below a predetermined minimum, and means adapted to move said movable indicia-bearing member in response to movement of said wing flap, said stationary member and said movable member cooperating to indicate the position of said wing flap.

References Cited in the file of this patent

UNITED STATES PATENTS

| | | |
|---|---|---|
| 1,871,877 | Buckman | Aug. 16, 1932 |
| 2,019,234 | Nistri | Oct. 29, 1935 |
| 2,116,960 | Brown et al. | May 10, 1938 |
| 2,178,637 | Link | Nov. 7, 1939 |
| 2,262,756 | Clexton | Nov. 18, 1941 |
| 2,269,019 | Hall | Jan. 6, 1942 |
| 2,292,392 | Miller | Aug. 11, 1942 |
| 2,350,599 | Feldheim | June 6, 1944 |
| 2,450,450 | Schmidinger | Oct. 5, 1948 |